Jan. 12, 1971  C. FITZ-JAMES REDFORD ET AL  3,553,866

FILMSTRIP VIEWING BOX

Filed Nov. 25, 1968

INVENTORS
CYRIL FITZ-JAMES REDFORD
JOSEPH D. BROWN

BY: *George A. Rolston*

PATENT AGENT

Jan. 12, 1971     C. FITZ-JAMES REDFORD ET AL     3,553,866
FILMSTRIP VIEWING BOX
Filed Nov. 25, 1968                          2 Sheets-Sheet 2
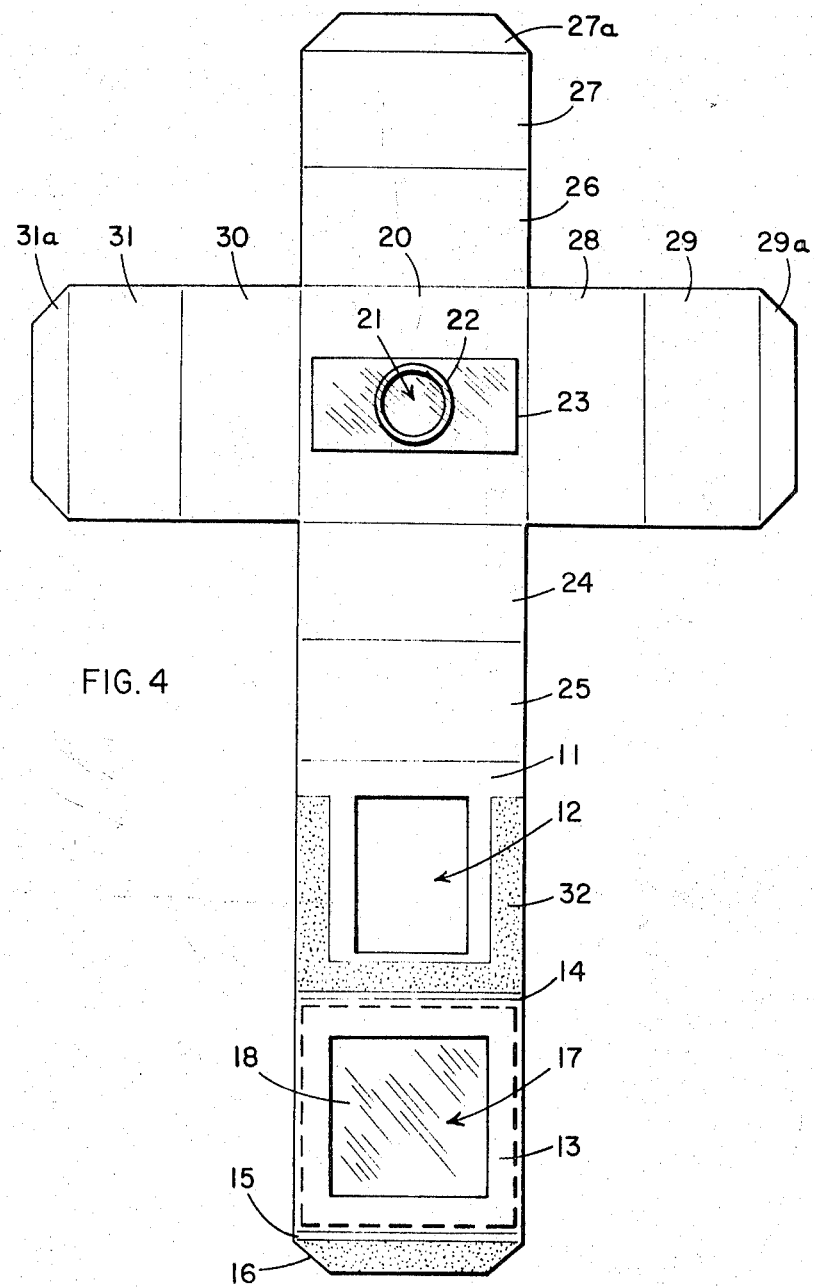
INVENTORS
CYRIL FITZ-JAMES REDFORD
JOSEPH D. BROWN
BY: *George A. Rolston*
PATENT AGENT United States Patent Office 3,553,866
Patented Jan. 12, 1971

3,553,866
FILMSTRIP VIEWING BOX
Cyril Fitz-James Redford, 11 Braecrest Ave., and Joseph Drewitt Brown, 151 Chapman Ave., both of Weston, Ontario, Canada
Filed Nov. 25, 1968, Ser. No. 778,722
Int. Cl. G09f 11/30
U.S. Cl. 40—63          7 Claims

ABSTRACT OF THE DISCLOSURE

This specification discloses a collapsible flat-folding viewing box for use with film transparencies arranged in the form of a filmstrip, the filmstrip being slidably engaged at one end of the box and adapted to be moved to and fro to bring individual transparencies into registration with an illuminated viewing window, and the box is further provided with an optical viewing opening spaced from the viewing window and having a viewing lens therein, the box excluding substantially all of the ambient light which might otherwise fall on the lens, and in this way, the image of the transparency can be viewed optically at its maximum brilliance, and the strip can be moved to and fro to select different transparencies. The box is collapsible and made of relatively inexpensive material so as to enable it to be folded flat and mailed out for advertising purposes and the like.

This invention relates to a so-called viewing box through which a person may study photographic transparencies arranged in the form of a filmstrip.

The use of strips of photographic transparencies sometimes twelve or twenty views on a single strip is widely adopted as an aid in demonstrating and selling new products, and is especially useful since such strips may be sent flat in the mail from a corporation head office to all its distributors and customers, without the need for salesman to make individual personal calls to demonstrate the product. Such filmstrips are found to have considerable appeal to such customers since the transparencies have considerably more interest, and present a much more life-like three-dimensional picture than an ordinary photographic print. In addition, such filmstrips are very cheap to photograph and reproduce, the commonest size being on the so called "half frame 35 mm. film" which is quite inexpensive both in the photography stage and in the mass reproduction stage. This is partly due to the fact that such film strips are commonly viewed under some sort of magnification whereas photographic positives or prints must be enlarged to many times the size of the negative in order that the detail may be studied by the naked eye.

For convenience sake, and since in some cases some of the customers receiving the filmstrips may not have suitable viewing facilities available, it is considered essential that an inexpensive viewing box be sent with each such filmstrip in order that the customer can open the envelope and immediately study the filmstrip simply by holding it up to the light and viewing it through the box. It is therefore obvious that such a viewing box must be of a virtually negligible cost such as to be substantially disposable, and must at the same time be of a collapsible nature such that it may be folded flat and shipped in an ordinary mailing envelope so as to permit mailing in an economical manner at reduced rates applicable to such advertising material. On the other hand, such a viewing box must provide for the viewer a certain minimum of magnification, and must also provide a means for illuminating the transparencies in the filmstrip one at a time in an effective manner so that the transparencies may be viewed to their best advantage. Thus, such a viewing box must be both collapsible, and also incorporate an eyepiece lens at one end of the box and a viewing window having a translucent light diffusing screen at the other end so as to permit overall even illumination of the transparency through such window. At the same time however, the box must be such as to effectively exclude substantially all the ambient light which might otherwise fall upon the lens and cause loss of brilliance of the picture seen at the window.

Examples of such a viewing box as shown in U.S. Letters Patent 2,789,460 and 3,386,194. However, the devices shown in such patents suffer from certain disadvantages. In particular, the folding of the walls of the box is so arranged that, in its collapsed condition, the box still presents relatively undesirably bulky package such that the envelope containing such a box and a filmstrip may be rendered too thick for handling in conventional bulk mailing machines. It will be understood that in order to make such a viewing box sufficiently cheap, it is necessary that it be manufactured out of relatively inexpensive cardboard material. However, in the case of the aforesaid box described in the earlier patents, it has generally speaking been found necessary that in order to reduce the thickness of the package, it is necessary that the box be manufactured of relatively thin paper material, with the result that when extended into its box like shape, the walls of the box are flexible and do not retain their shape during use. In addition, the walls of the box do not always meet, and relatively substantial gaps remain through which ambient light may pass and fall upon the lens.

Applicant's invention seeks to overcome these various disadvantages by providing a viewing box for a filmstrip which is designed and adapted to be manufactured of relatively thick stiff card stock such that it retains its shape for a fairly extended period of use, and which is yet adapted to be folded flat in a manner suitable for mailing in a standard size envelope without producing an excessively bulky package. Among the features leading to the achievement of these advantages are the use of card stock provided with a series of partial incisions along the fold lines of the package, which incisions permit the making of a much flatter fold than would otherwise be possible, and the use of a folding wall construction for the four sidewalls of the box each of which sidewalls consist of two folding panels adapted to fold outwardly with respect to the interior of the box in a star-shaped manner.

It is a further and related objective of the invention to provide a blank of card stock suitable for manufacture of a filmstrip viewing box according to the invention.

More specifically it is an objective of the invention to provide a viewing box of the type described having the foregoing advantages and incorporating an improved slide means for slidable retension of the filmstrip while permitting selection of a particular transparency of the strip in the window in registration with the viewing lens.

More particularly it is an objective of the present invention to provide a viewing box having a illumination window at one end of the box and a viewing lens at the other end of the box, and having four intermediate sidewalls each of which consists of two foldable panels adapted to extend outwardly with regard to the interior of the box, each of said sidewalls having side edges which are adapted to contact and engage adjacent side edges of adjacent side walls when the box is extended for use thereby providing a substantially light proof enclosed box excluding all ambient light and ensuring an image of maximum brilliance.

The foregoing and other objectives will become apparent from the following description of a preferred embodiment of the invention which is given here by way of example only with reference to the following drawings in which like reference devices refer to like parts thereof throughout the various views and diagrams and in which:

FIG. 4 is a plan view of a blank of such a viewing box prior to glueing into place.

Figure 1:
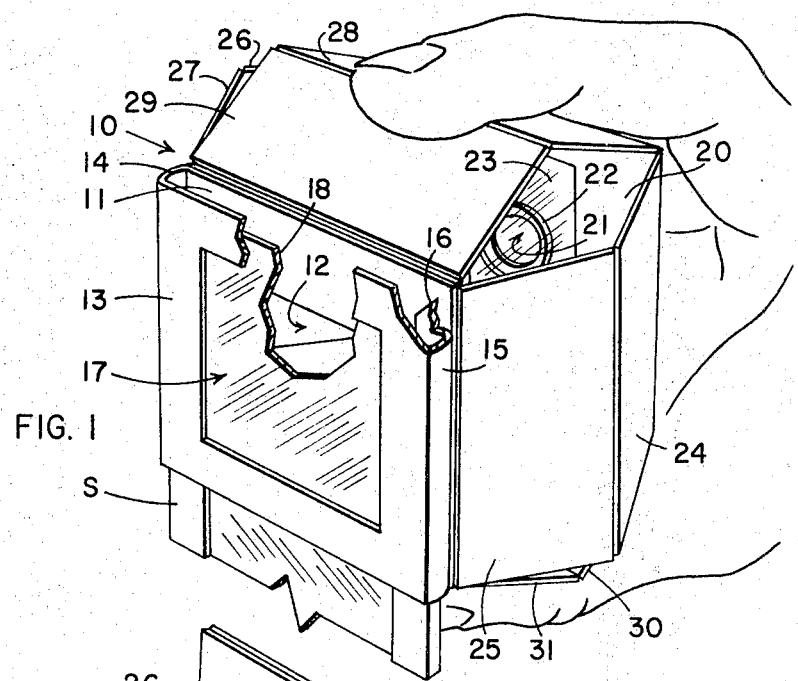
FIG. 1 is a cut away perspective illustration of a viewing box showing a portion of a filmstrip in position therein, the box being almost in its completely extended or viewing position.
Figure 2:
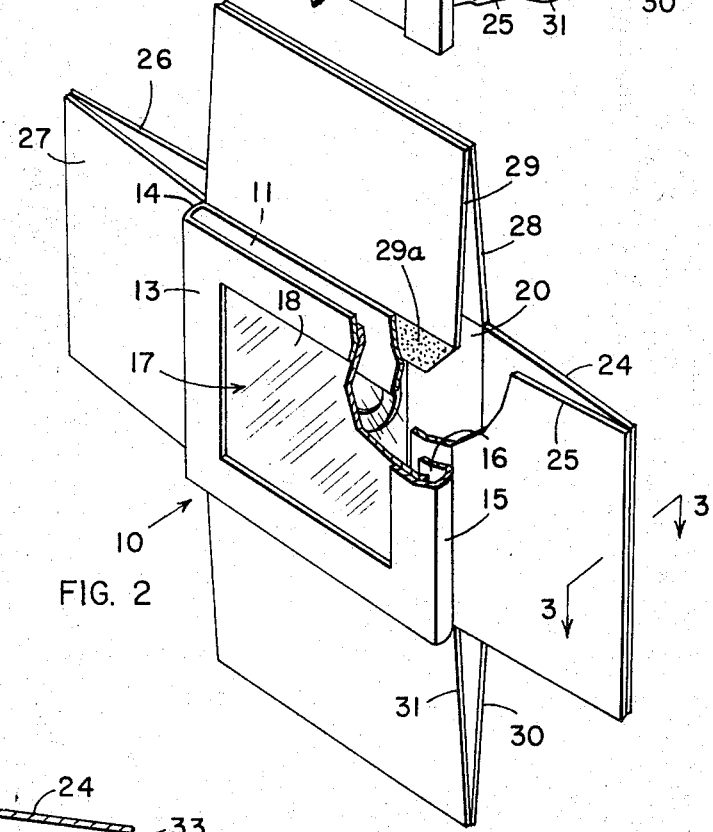
FIG. 2 is a perspective illustration partially cut away, similar to FIG. 1 in which the side walls of the box are shown almost completely folded, in its collapsed or mailing position.

Referring now to FIG. 1, it will be seen that this illustration shows the viewing box according to the invention held between the finger and thumb of a user, and showing a portion of a filmstrip inserted in position for viewing. The viewing box according to the invention is indicated generally by the reference number 10 and will be seen to comprise a front or window panel 11 having a rectangular window opening 12 formed therein, and having attached thereto a slide retaining panel 13, being connected thereto by means of end walls 14 and 15. It will be noted that end wall 14 constitutes an endwise extension of front panel 11, and end wall 15 is provided with a glueing flap 16 folded back upon itself and glued to the front surface of front wall 11 along a marginal portion thereof, end walls 14 and 15 defining a spacing between retaining panel 13 and front panel 11 sufficient to receive a filmstrip indicated generally as S therein in position for viewing. Retaining panel 13 is provided with a further light transmission window 17, of a size somewhat greater than the viewing window 12, and having a sheet of translucent light diffusing material 18 glued around the marginal area thereof and extending entirely over window 17, thereby permitting light to pass therethrough, while diffusing the same over the extent of viewing window 12 whereby to provide even illumination of a film transparency held between retaining panel 13 and front panel 11.

A rear panel 20 of rectangular shape, and of a size identical to the dimensions of front panel 11 is provided with a circular eye viewing opening indicated as 21 in which is fastened a lens 22 by any suitable means such as the sheet of transparent plastic adhesive material 23.

The box 10 is completed by four identical collapsible sidewalls made up of side wall panel portions 24, 25, 26 and 27, and upper and lower collapsible sidewalls made up of wall panels 28, 29, 30 and 31. As will be seen from the illustration in FIG. 4, panel portion 25 consists of an endwise extension of front panel 11, and panel portions 27, 29 and 31 are all provided with identical glueing flaps indicated as 7A, 29A and 31A respectively. These glueing flaps are formed with corner portions cut at 45°, and are folded inwardly upon themselves and glued to the interiorly directed marginal surface portions of front panel 11, on glueing areas indicated in FIG. 4 as reference 32.

Figure 3:
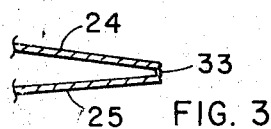
FIG. 3 is a section along the line 3—3 of FIG. 2, greatly enlarged.

The entire box 10, apart from the lens 22 and transparent plastic sheet 23 and translucent sheet 18 is formed of a single portion of stiff relatively thick cardboard sheet material, die cut in the shape of the blank shown in FIG. 4, and in order to ensure that the box and its various wall portions and the like will be capable of being folded flat for mailing and yet will be capable of extending into its predetermined positional relationship, with the lens 22 and back wall 20 oriented more or less parallel to the front wall 11, and with the central axis of the lens 22 substantially aligned with the center of the viewing opening 12, it is found desirable to provide hinge lines which are especially well defined and formed. In this connection, it is noted that the conventional practice in the packaging art of forming fold lines in a blank by indenting the cardboard material along the fold lines is generally speaking not sufficient for the practice of the present invention. In the present case, it is found desirable that, as stated, the card stock from which the blank is made should be relatively stiff and is hence quite difficult to bend, and will not readily lie flat when doubled over. In order to overcome these various factors, hinge lines indicated as 33 (in FIG. 3) are formed by partial incisions of the card stock, as shown in FIG. 3, whereby the portion of the card stock remaining uncut along the hinge line will be capable of flexing through at least 90° and in its collapsed form will provide a flat folded package suitable for mailing in an envelope. It is to be noted that such partial incisions to provide hinge lines 33 are provided at all points where the side walls join the front and back walls and along the junctions between the two panel portions forming each side wall. It is incidentally of interest to note that, because in the case of applicants' invention, all of the side walls fold outwardly when the device is folded flat, that all of the incisions forming hinge lines 33 appear on the same side of the blank during manufacture, thereby considerably reducing the cost of manufacture, while also improving the quality and function of the device in use.

It will be noted that all of the collapsible side walls of the box are of identical rectangular shape and dimensions. This produces an overall box which is shaped in the form of a cube, as distinguished from prior art devices which were of generally wedge shaped construction. Such construction considerably improves the overall rigidity and life of the device, and also ensures that when the box is in its extended, viewing position, the edges of the sidewalls meet with one another and exclude almost all the ambient exterior light, thereby improving the brilliance of the image which can be seen through the viewing window 12.

The foregoing description of a preferred embodiment of the invention is given here by way of example only. The invention is not to be taken as limited to any of the specific features described, but comprehends all such variations thereof as come within the scope of the following claims.

What we claim is:

1. A collapsible flat-folding viewing box formed of stiff card or the like for use with film transparancies arranged in the form of a filmstrip and comprising:

a front wall defining a rectangular viewing opening therethrough, and having side edges and top and bottom edges;

a strip retaining panel forming an endwise integral extension of one side edge of said front wall, and defining a light transmission opening therethrough;

translucent light diffusing means attached over said opening;

glue flap means at the free edge of said strip retaining panel opposite to said one side edge of said front wall folded back upon itself and glued to the outwardly directed surface of said front wall along the other said side edge thereof, and locating said panel spaced a predetermined distance from said front wall to receive a said film strip therebetween;

a back wall defining an eyepiece opening therethrough and having side edges and top and bottom edges;

viewing lens means fastened in said opening;

a side wall extending between one of said top or bottom edges of said front wall and a corresponding edge of said back wall formed integrally in one piece therewith;

three other side walls formed integrally with said back wall and constituting endwise extensions of said side edges and the other of said top or bottom edges thereof;

glue flap means at the free edges of said three sidewalls remote from said back wall, folded inwardly and glued to the inwardly directed surfaces of said front wall;

hinge lines formed at the junctions between said front wall and said side walls and said back wall and said side walls, and hinge lines formed intermediate of said sidewalls separating same into equal rectangular panels, for folding outwardly with respect to said front and back walls.

2. A collapsible flat-folding viewing box as claimed in claim 1 wherein said front wall and said back wall are of rectangular shape and have the same dimensions.

3. A collapsible flat-folding viewing box as claimed in claim 1 wherein all four of said sidewalls are of rectangular shape and have the same dimensions.

4. A collapsible flat-folding viewing box as claimed in claim 1 wherein said hinge lines comprise incisions partially severing the card or the like from which the box is made.

5. A collapsible flat-folding viewing box as claimed in claim 1 including end wall strip members arranged on either side of said strip retaining panel and extending between said strip retaining panel and said front wall, substantially normal thereto, thereby spacing said strip retaining panel from said front wall at aforesaid.

6. A collapsible flat-folding viewing box as claimed in claim 1 wherein said front wall, said retaining panel, said glue flap means, said back wall, said first sidewall, and said three other sidewalls, and said glue flap means, are all formed from a single integral portion of card stock.

7. A collapsible flat-folding viewing box as claimed in claim 1 wherein said gluing flaps on said three side walls are formed with corners cut at approximately 45°.

References Cited

UNITED STATES PATENTS

| | | | |
|---|---|---|---|
| 2,715,853 | 8/1955 | Austin | 40—63X(A) |
| 3,386,194 | 6/1968 | Kaufman | 40—63(A) |
| 3,438,698 | 4/1969 | Triggs | 40—63X(A) |

JEROME SCHNALL, Primary Examiner

R. CARTER, Assistant Examiner